US012124512B2

(12) United States Patent
Suh et al.

(10) Patent No.: US 12,124,512 B2
(45) Date of Patent: Oct. 22, 2024

(54) METHOD, APPARATUS, AND COMPUTER PROGRAM FOR PROVIDING CYBER SECURITY BY USING A KNOWLEDGE GRAPH

(71) Applicant: S2W INC., Gyeonggi-do (KR)

(72) Inventors: Sang Duk Suh, Gyeonggi-do (KR); Changhoon Yoon, Gyeonggi-do (KR); Seung Hyeon Lee, Daejeon (KR)

(73) Assignee: S2W INC., Seongnam-si (KR)

( * ) Notice: Subject to any disclaimer, the term of this patent is extended or adjusted under 35 U.S.C. 154(b) by 85 days.

(21) Appl. No.: 17/607,861

(22) PCT Filed: Jan. 30, 2020

(86) PCT No.: PCT/KR2020/001384
§ 371 (c)(1),
(2) Date: Oct. 29, 2021

(87) PCT Pub. No.: WO2020/222404
PCT Pub. Date: Nov. 5, 2020

(65) Prior Publication Data
US 2022/0292137 A1 Sep. 15, 2022

(30) Foreign Application Priority Data
Apr. 30, 2019 (KR) .................. 10-2019-0050717

(51) Int. Cl.
*G06F 16/901* (2019.01)
*G06F 16/906* (2019.01)
*G06F 21/57* (2013.01)

(52) U.S. Cl.
CPC ........ *G06F 16/9024* (2019.01); *G06F 16/906* (2019.01); *G06F 21/577* (2013.01); *G06F 2221/033* (2013.01)

(58) Field of Classification Search
CPC .. G06F 16/9024; G06F 16/906; G06F 21/577; G06F 2221/033; G06F 16/26; G06F 21/57; G06F 16/2246; G06F 21/16
See application file for complete search history.

(56) References Cited

U.S. PATENT DOCUMENTS

| 9,158,838 | B2 * | 10/2015 | Peoples | G06F 16/367 |
| | | | | 707/748 |
| 10,496,678 | B1 * | 12/2019 | Tang | G06F 16/29 |
| | | | | 707/748 |

(Continued)

FOREIGN PATENT DOCUMENTS

| JP | 2017-167889 | 9/2017 |
| JP | 2019-049800 | 3/2019 |

(Continued)

OTHER PUBLICATIONS

Office Action issued Sep. 27, 2022 for Japan App. No. 2021-562311, with English translation, 6 pages.

(Continued)

*Primary Examiner* — Yuk Ting Choi
(74) *Attorney, Agent, or Firm* — Sughrue Mion, PLLC (57) ABSTRACT

The present invention relates to a method for processing a knowledge graph in a data processing apparatus, comprising the steps of: (a) creating a knowledge graph including a taxonomy graph for a classification system of information objects and an entity graph for a relationship between specific information object instances; (b) updating the knowledge graph by reflecting the information objects extracted from a database in the knowledge graph; and (c) inferring the relevance of a random information object by using the updated knowledge graph.

9 Claims, 7 Drawing Sheets

(56) References Cited

U.S. PATENT DOCUMENTS

| | | | |
|---|---|---|---|
| 10,958,667 B1* | 3/2021 | Maida | H04L 63/1425 707/748 |
| 2010/0275182 A1 | 10/2010 | Marfatia et al. | |
| 2014/0280224 A1* | 9/2014 | Feinberg | G06F 16/9024 707/748 |
| 2016/0092790 A1* | 3/2016 | Ribeiro Mendes Júnior | G06N 20/00 706/12 |
| 2018/0173694 A1* | 6/2018 | Liu | G06N 20/10 707/748 |
| 2018/0225382 A1 | 8/2018 | Crabtree | |
| 2019/0102430 A1 | 4/2019 | Wang | |
| 2019/0132344 A1* | 5/2019 | Lem | G06N 20/00 707/748 |
| 2019/0182273 A1* | 6/2019 | Walsh | H04L 63/1425 707/748 |
| 2019/0318121 A1* | 10/2019 | Hockenbrocht | G06F 21/6245 707/748 |
| 2021/0192375 A1* | 6/2021 | Xia | G06F 16/43 707/748 |
| 2022/0027900 A1* | 1/2022 | Suh | G06N 3/08 706/12 |

FOREIGN PATENT DOCUMENTS

| | | |
|---|---|---|
| JP | 2019-074843 | 5/2019 |
| KR | 10-2014-0058057 | 5/2014 |
| KR | 10-2015-0084706 | 7/2015 |
| KR | 10-1852107 | 4/2018 |
| KR | 10-1936263 | 1/2019 |

OTHER PUBLICATIONS

International Search Report from PCT/KR2020/001384 dated May 8, 2020 (with English translation), 2 pgs. including Written Opinion in Korean, 3 pgs.; 5 pages total.

* cited by examiner

METHOD, APPARATUS, AND COMPUTER PROGRAM FOR PROVIDING CYBER SECURITY BY USING A KNOWLEDGE GRAPH

CROSS-REFERENCE TO RELATED APPLICATIONS

This application claims priority to and is a 35 U.S.C. § 371 national phase application of PCT/KR2020/001384 (WO 2020/222404), filed on Jan. 30, 2020, entitled "METHOD, APPARATUS, AND COMPUTER PROGRAM FOR PROVIDING CYBER SECURITY BY USING A KNOWLEDGE GRAPH", which application claims priority to and the benefit of Korean application 10-2019-0050717, filed Apr. 30, 2019, the disclosures of which are incorporated herein by reference in their entirety.

TECHNICAL FIELD

The present disclosure relates to a method and a system for constructing a knowledge-based graph and inferring circumstances related to a crime and/or relevance thereof by utilizing the knowledge-based graph.

BACKGROUND ART

With the recent development of Internet technology, information based on a virtual world is increasing. Information in cyberspace including not only a normal web which is accessible by a search engine through a normal browser, but also a deep web in which an access authority is required, an anonymized dark web which is inaccessible by a normal browser but accessible using specific software, and a cryptocurrency distributed ledger geometrically increases every moment.

With such a trend, considerable parts of areas of crimes have been transferred to cyberspace. For example, procuration for prostitution is made for many and unspecified persons and drugs are sold on the basis of the Twitter, and malicious codes such as ransomware are distributed through the Web. Furthermore, the Tor network is a dark web to which a technology for user anonymity is applied, and has rapidly grown since 2010, becoming a breeding ground for various types of illegal trade such as arms trade, drug trade, organ trade, hacking tool sales, hacking technique sharing, personal information trade, pornography sales, etc., in combination with cryptocurrency.

DISCLOSURE OF INVENTION

Technical Problem

The present disclosure is to provide a method for forming information in the virtual world in a form of a knowledge-based graph and inferring circumstances related to a crime or relevance thereof by utilizing the knowledge-based graph in an area related to a crime or a threat.

Technical Solution

According to an embodiment of the present disclosure, a method for processing a knowledge-based graph by a data processing device includes the operations of: a) creating a knowledge-based graph including a taxonomy graph for a classification system of information objects and an entity graph for a relationship between specific information object instances; b) applying object information extracted from the database to the knowledge-based graph to update the knowledge-based graph; and c) inferring the relevance of an arbitrary information object by using the updated knowledge-based graph.

Advantageous Effects

The present disclosure is advantageous in that data in a virtual space can be formed in a knowledge-based graph, the relationship between information objects can be identified, and circumstances related to a crime and/or relevance thereof can be inferred on the basis of the knowledge-based graph. Furthermore, the present disclosure is advantageous in that not only normal data which is accessible through a normal web browser but also massive special data which is only accessible through a special browser can be collected, and information relevance can be analyzed by applying the collected data to the knowledge-based graph.

MODE FOR INVENTION

It is apparent that the present disclosure is not limited to the embodiments described below and may include various modifications without departing from the technical idea of the present disclosure. In describing embodiments, descriptions of technologies which are already known to those skilled in the art and are not directly related to the gist of the present disclosure may be omitted.

Like reference numerals refer to like elements throughout the accompanying drawings. In addition, in the drawings, some elements may be exaggerated, omitted, or schematically illustrated, which is to clarify the gist of the present disclosure by omitting unnecessary descriptions not related to the gist of the present disclosure.

There is massive data in the virtual world, but the form thereof is not standardized, each piece of information individually exists, and thus it is not easy to identify the relevance between pieces of information or analyze the meaning of the related information. To solve this problem, a knowledge-based graph has been adopted. A knowledge-based graph is a graph obtained by structuralizing pieces of information, may be used to identify the relationship between individually existing pieces of information and the relevance therebetween, and may function as an element of a search engine for providing a search result in a smarter manner.

Figure 1:
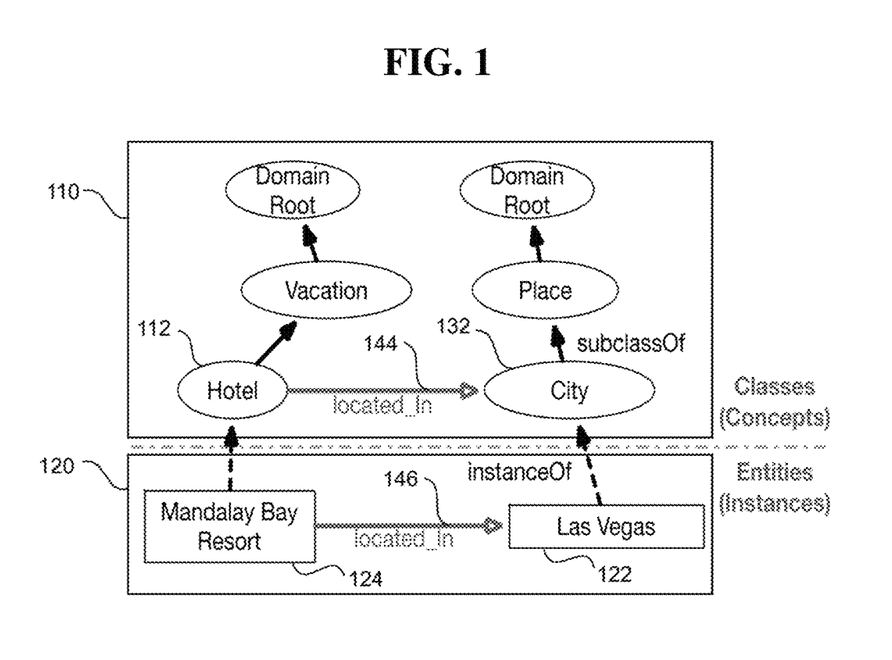
FIG. 1 illustrates a configuration of a knowledge-based graph according to an embodiment of the present disclosure.

A knowledge-based graph according to an embodiment of the present disclosure may include a node and an edge as illustrated in FIG. 1.

A node in the knowledge-based graph according to an embodiment of the present disclosure may include a class node and an entity node. The class node may be defined as relating to concepts constituting a hierarchical structure for classification and structurization of information, and the entity node may be defined as relating to instances matching to arbitrary classes. In an example of FIG. 1, the class node includes a hotel 112 and a city 132, and the entity node is illustrated as Mandalay Bay Resort 124 that is matched to the hotel 112 class as an instance, and Las Vegas 122 that is matched to the city class as an instance.

An edge relates to the relationship between nodes and may have directivity. In an example of FIG. 1, the hotel node 112 and the city node 132 may be connected to each other through an edge 144 indicating the <located-in> relationship.

The knowledge-based graph may include a taxonomy graph 110 for a classification system of various objects and an entity graph 120 for the relationship between specific object instances, wherein the taxonomy graph 110 and the entity graph 120 may be formed in separate layers, respectively, as shown in FIG. 1, but may be mapped to each other.

By utilizing the knowledge-based graph according to an embodiment of the present disclosure, a search engine can be provided in a smarter way. That is, by using the knowledge-based graph, a clearer meaning of a query can be inferred and a search result of the query can be also derived.

For example, when a query is <Las Vegas hotel>, the search engine may identify the class node 112 for <hotel> by utilizing the knowledge-based graph illustrated in FIG. 1, identify the Las Vegas entity node 122 that is an instance of the node 112, identify a class, i.e., <city> 132, mapped to the Las Vegas instance, and identify link information 144, i.e., <located-in>, between the class 112 and the class 132, so as to infer that the meaning of the received query is <search for a hotel located in Las Vegas>. Furthermore, a query inference result may be provided to the search engine for a hotel domain.

In addition, the search engine may search for another instance node having a vector similar to that of a location value of the node 124 connected to the hotel node 112 and the Las Vegas node 122 in the knowledge-based graph by utilizing the knowledge-based graph illustrated in FIG. 1, and provide information on the corresponding instance node as a search result for <hotel located in Las Vegas>. There are various algorithms for analyzing the relevance between nodes on the basis of the knowledge-based graph and the corresponding algorithms will be described below.

Figure 2:
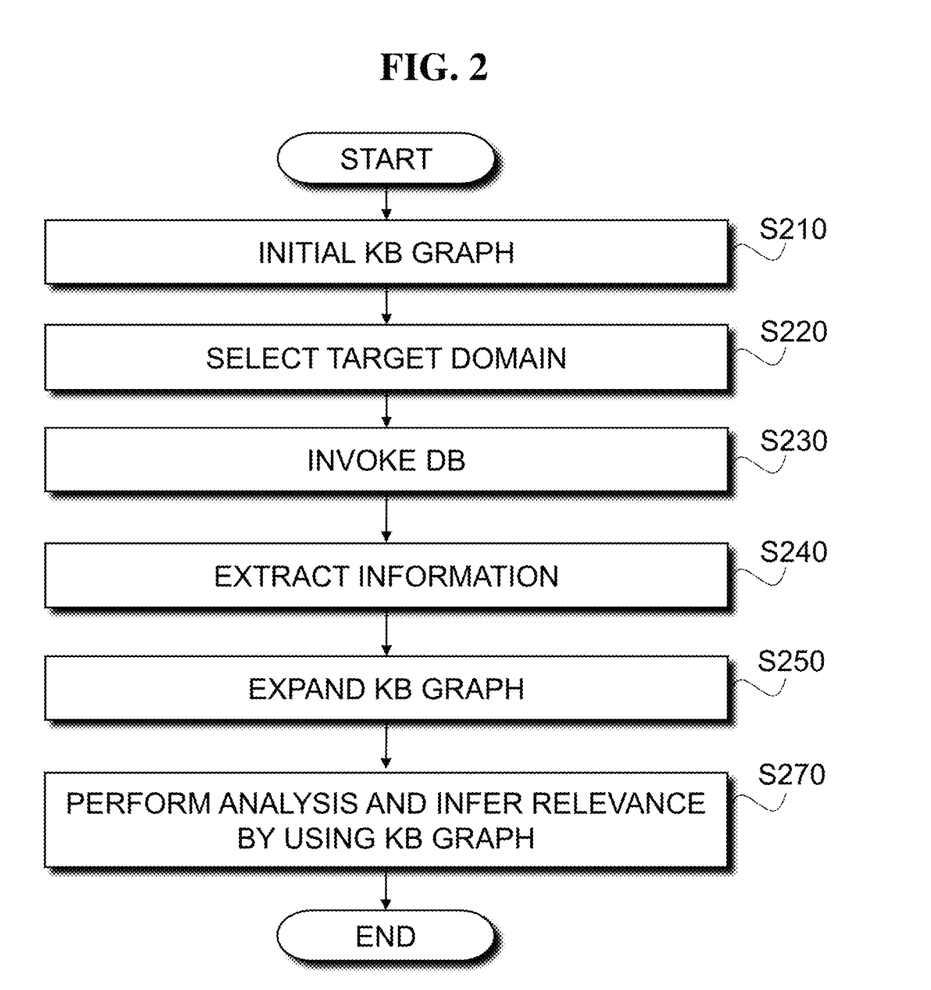
FIG. 2 is a flow chart illustrating an example of creating a knowledge-based graph and inferring circumstances related to a crime and/or relevance thereof on the basis of the created knowledge-based graph according to an embodiment of the present disclosure.

FIG. 2 is a flow chart illustrating an example of creating a knowledge-based graph and inferring the relevance of cybercrime on the basis of the created knowledge-based graph in a data analysis system according to an embodiment of the present disclosure.

In operation 210, a data analysis system according to an embodiment of the present disclosure may configure an initial model of a knowledge-based graph.

An initial knowledge-based graph may include a taxonomy graph for a classification system of one or more objects of multiple domains and an entity graph for a relationship between specific object instances. The taxonomy graph and the entity graph may be formed in different layers, but may be mapped to each other. The initial knowledge-based graph may be created by using a highly reliable classification model such as Wikipedia and Yago as a source, and in this case, a model may be represented in different data types such as json, csv, xml, and xlsx.

For example, the data analysis system may structuralize multiple data sources shown in Table 1 below and create an initial knowledge-based graph in a taxonomy graph and an entity graph format. According to an embodiment of the present disclosure, it is appropriate for a data model to be applied as a data source for creating an initial knowledge-based graph, wherein the reliability on data classification and object instance matching of the data model is recognized and the data model functions as a de facto standard.

TABLE 1

| Source | Vendor | Topic | Data type |
| --- | --- | --- | --- |
| YAGO | Max Planck Institute | General | Csv |
| NVD-CVE | NIST | Vulnerabilities | Json, xml |
| NVD-CWE | NIST | Weaknesses | xml |
| NVD-CPE | NIST | Platforms | xml |
| Microsoft bulletin | Microsoft | Vulnerabilities | xlsx |
| Exploit-db | Offensive Security | Exploits | csv |

In this case, the initial knowledge-based graph may include a global model and/or a domain-specific model. The global model may have, for example, a YAGO model in Table 1 as a data source, and the domain-specific model may include a specific instance mapped to each class and a detailed classification system relating to a specific topic such as vulnerability, a weakness, a patch, and exploits. The global model relates to a relationship between all objects, and may thus include the domain-specific graph as a sub class.

Furthermore, the data analysis system may record metadata of a node. The metadata may be recorded as a label of the node, and the label may include property information of the node. For example, in the knowledge-based graph in FIG. 4A, a CVE-2015-2544 node 421 of an entity graph, which is connected to a CVE node 412 of a taxonomy graph for a vulnerability domain 410, may be configured to have a label 431 called <Internet Explorer vulnerability> as the property information thereof. In another example, the metadata of the node may include information on the data source, and is illustrated 441 of FIG. 4A.

According to an embodiment of the present disclosure, the data analysis system may record, in a knowledge-based graph, the content of an edge, which describes a relationship between nodes. The edge may perform a role of indicating the relevance between node objects, and include information on the directivity information and the relationship between the nodes.

Figure 4A:
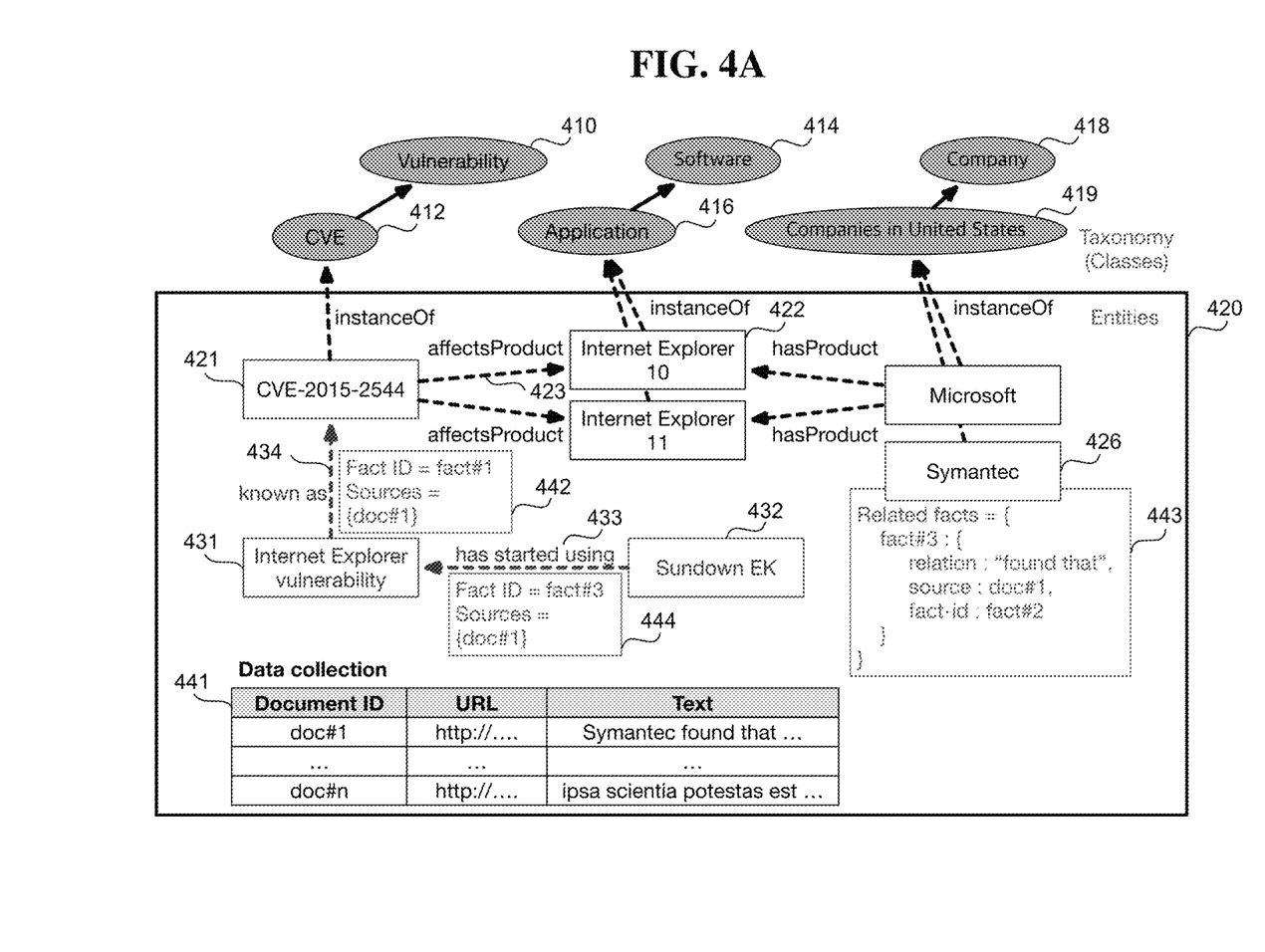
FIG. 4A illustrates a specific example of standardizing massive data collected from a multi-domain and expanding a knowledge-based graph according to an embodiment of the present disclosure, and illustrates a specific example of an initial knowledge-based graph created by standardizing massive data collected from a multi-domain according to an embodiment of the present disclosure.

For example, in the knowledge-based graph of FIG. 4A, an Internet Explorer 10 node 422 of an entity graph connected to an application node 416 of a taxonomy graph for a software domain 414 may be connected to a node 421 through an edge 423, wherein the edge 423 may be configured with the content called <affectsProduct>.

In operation 220, the data analysis system may select a target domain According to an embodiment of the present disclosure, a knowledge model related to cyber security, crime, and/or threat as the target domain.

Thereafter, the data analysis system may: collect massive information related to cyber security from various sources and construct a database for the collected information (operation 230); refine information extracted from the database in a pre-configured form (operation 240); and expand a knowledge-based graph by adding a domain-specific model for the target domain to the initial knowledge-based graph (operation 250).

More specifically, in operation 230, the data analysis system may invoke the database for the target domain.

The database may store data open to a normal web environment and cyber security-related information collected from a deep web in which a separate access authority is required, a dark web which is accessible via a specific browser, and/or a cryptocurrency network. A more detailed description of information collection in a multi-domain for database construction will be made with reference to accompanying FIG. 5.

Thereafter, the data analysis system may extract information from the database and refine information in a pre-configured form (operation 240). A more detailed description of operation 240 will be made in the description of accompanying FIG. 3.

Figure 3:
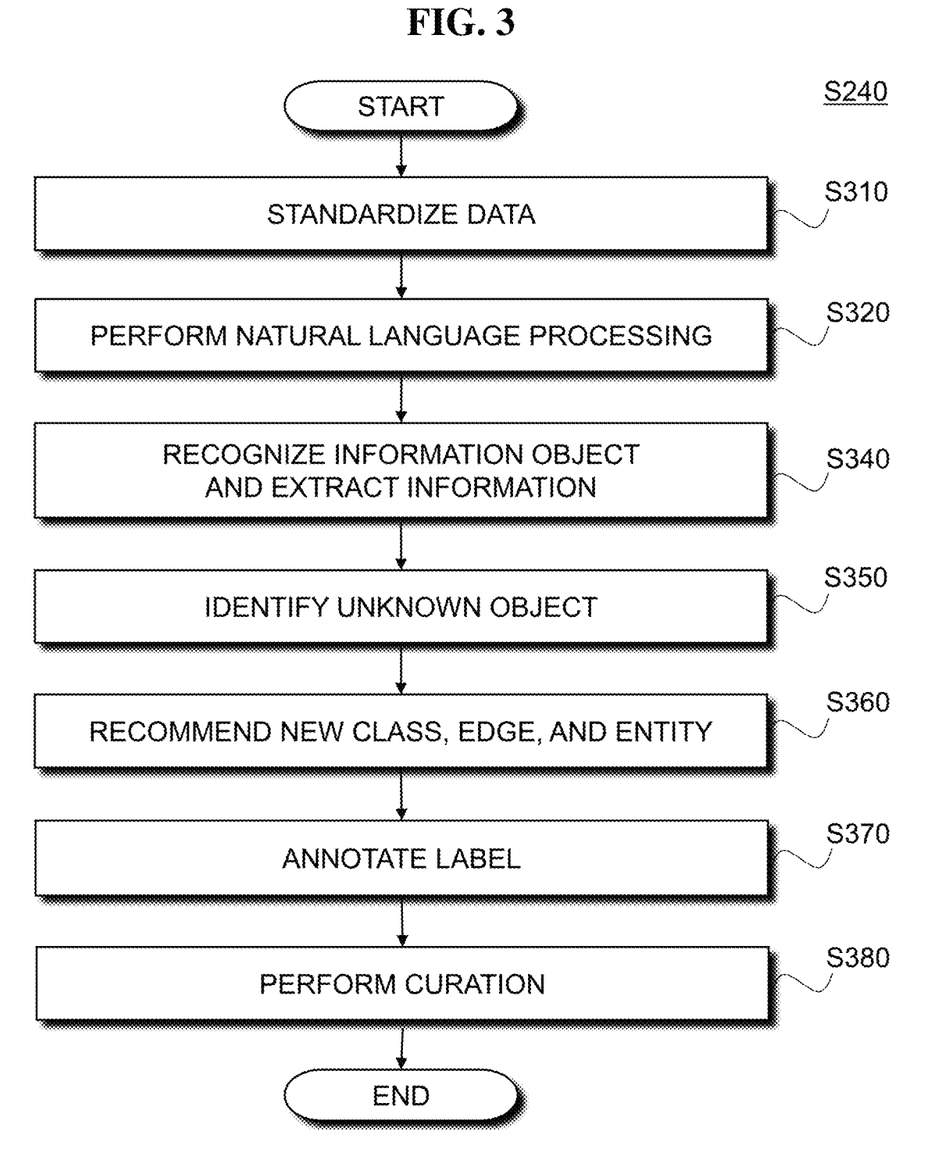
FIG. 3 is a flow chart illustrating a specific method for standardizing massive data collected from a multi-domain and extracting information which can be applied to a knowledge-based graph.

FIG. 3 is a flow chart illustrating a specific method for standardizing massive data collected from a multi-domain and extracting information which can be applied to a knowledge-based graph.

In operation 310, the data analysis system may standardize massive data collected in the database in a pre-configured form, or may extract information to be applied to the knowledge-based graph on the basis of the content of the collected massive data.

For example, a case in which the collected data is non-standard text may be considered. The data analysis system may extract, in operation 340, data of information objects and the relationship between information objects from the corresponding text by using an existing algorithm, such as an algorithm for natural language processing (operation 320), an algorithm for object extraction, and/or OPEN IE for information extraction.

For example, the data analysis system may extract, from a newspaper article including text <The JPMorgan Chase has come under a DDoS attack>, <JPMorgan Chase> as a subject, and may extract, from the newspaper article <DDoS> and <has come under a DDos attack> as predicates, and identify a <JPMorgan Chase> node and a <DDoS> node from the knowledge-based graph. In this case, the <JPMorgan Chase> corresponds to an entity node of a <banking company> class, and the <DDoS> corresponds to an entity node of a <cyber security attack> class. Furthermore, the data analysis system may connect the <JPMorgan Chase> node and the <DDoS> node through an edge, and record <attack> as the content of the edge.

In another example, a case in which the collected data is an image may be considered. The data analysis system may extract text from the image by applying an optical character recognition (OCR) technology, and standardize the extracted text according to a pre-configured format. Thereafter, the data analysis system may extract data of information objects and the relationship between the information objects from the corresponding data by using an algorithm for natural language processing, an algorithm for object extraction, and an algorithm for information extraction. Furthermore, the data analysis system may generate metadata relating to a creator, a created time, and source domain information of a target image, etc.

In another example, when the collected data is an execution file, the data analysis system may analyze the content of the execution file to determine whether the execution file includes a malicious code, and also generate multiple URL paths for reaching the malicious code or generate metadata of a hash of the corresponding malicious code, a file type, and a malicious code access counter information of each URL path, on the basis of information on a domain from which the execution file is collected.

The data analysis system may identify, from the massive data collected in the database, an information object, i.e., an unknown object (operation 350), which is not identified from the knowledge-based graph at the corresponding time point, and may apply the identified unknown object to the knowledge-based graph.

For example, when an OPEN IE algorithm for information extraction according to an embodiment of the present disclosure is applied to the text data called <Symantec found that Sundown EK has started using a recent Internet Explorer vulnerability known as CVE-2015-2444> extracted from an arbitrary data source, one or more subject-verb-object relationships as shown in Table 2 below may be extracted.

TABLE 2

Triple #1

| a recent Internet Explorer vulnerability | known as | CVE-2015-2444 |

Triple #2

| Symantec | found that |

| the Sundown EK started using a recent Internet Explorer vulnerability |

Triple #3-1

| the Sundown EK | has started using |

| a recent Internet Explorer vulnerability |

Triple #3-2

| the Sundown EK | has started |

| using a recent Internet Explorer vulnerability |

When information objects in Table 2 are classified according to the relationship between a node and an edge, the information objects may be represented as data shown in Table 3 below.

TABLE 3

Fact #1

| Internet Explorer vulnerability | —known as→ | CVE-2015-2444 |

Fact #2

| Symantec | —found that→ | Fact #3 |

Fact #3

| Sundown EK | —has started using→ | Internet Explorer vulnerability |

Thereafter, the data analysis system applies the data standardized in the form in Table 3 to the knowledge-based graph. In this case, a node that is not identified from the knowledge-based graph at the corresponding time point is identified as an unknown object, and a new class and/or entity for the unknown object may be recommended (operation 360).

For example, it is appropriate to form the <CVE-2015-2444> information object in Table 3 as an entity node in a CVE class in the knowledge-based graph in consideration of a data type in which "CVE", "2015", and "2444" are connected. Furthermore, it is appropriate to form the <Symantec> information object in Table 3 as an entity node in a company class since the information object is found as an entity node in a company class in the knowledge-based graph by a keyword.

In this case, the <Internet Explorer vulnerability> and <Sundown EK> information objects in Table 3 correspond to unknown objects that are not identified from the knowledge-based graph, and the unknown information objects may be formed in the knowledge-based graph by using the relationship between the unknown information objects and the information objects such as the <CVE-2015-2444> information object and the <Symantec> information object. The description thereof will be made with reference to accompanying FIGS. 4A through 4C.

Figure 4B:
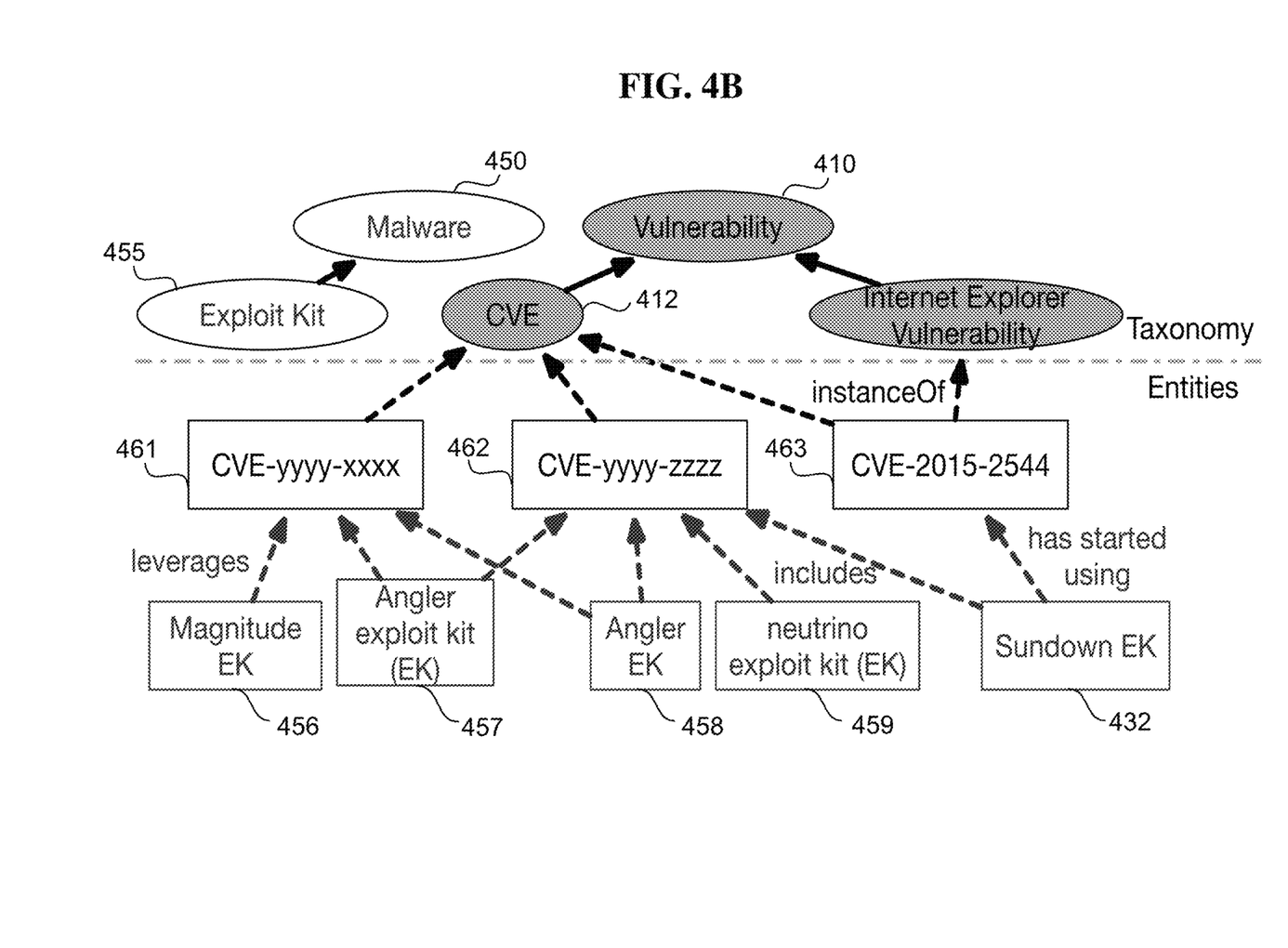
FIG. 4B illustrates a specific example of standardizing massive data collected from a multi-domain and expanding a knowledge-based graph according to an embodiment of the present disclosure, and illustrates a specific example of recommending a new class for expanding an initial knowledge-based graph.
Figure 4C:
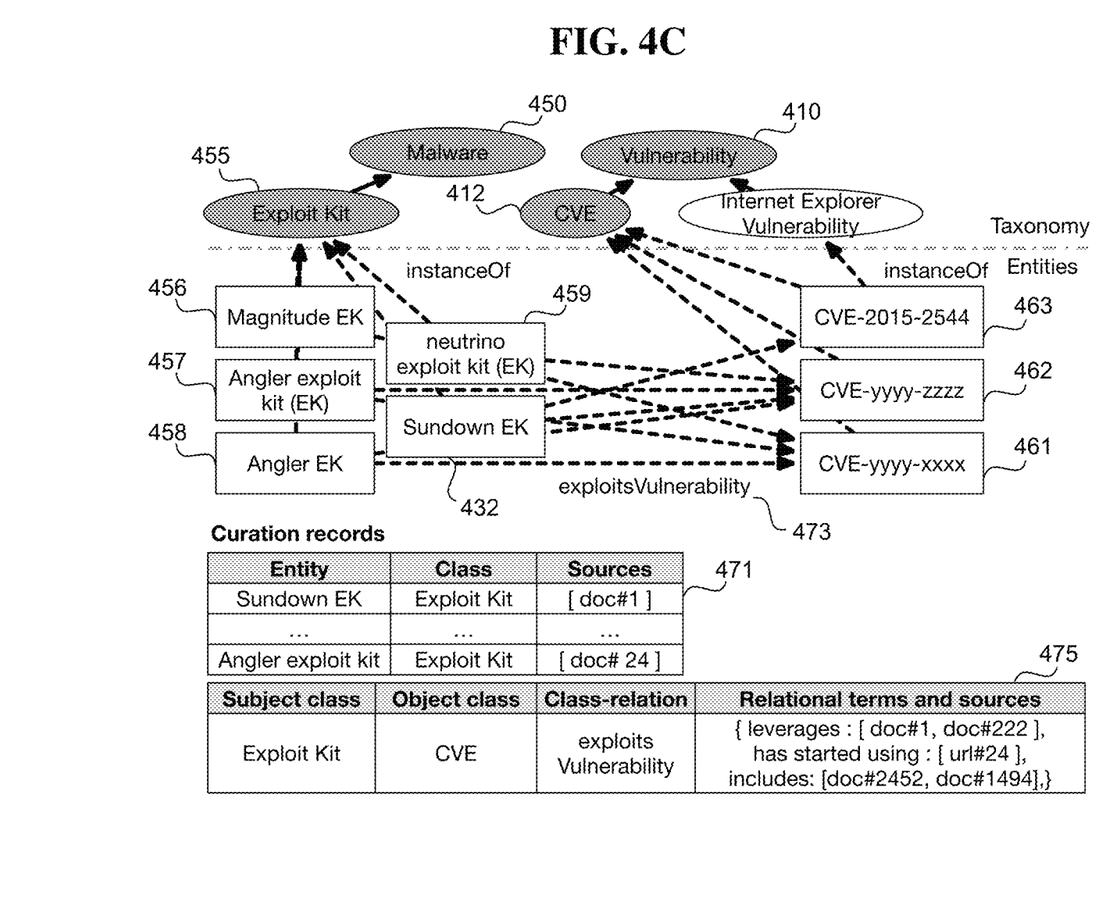
FIG. 4C illustrates a specific example of standardizing massive data collected from a multi-domain and expanding a knowledge-based graph according to an embodiment of the present disclosure, and illustrates a specific example of an expanded knowledge-based graph according to an embodiment of the present disclosure.

FIGS. 4A through 4C illustrate a detailed example of standardizing massive data collected in a multi-domain and expanding a knowledge-based graph.

In FIG. 4A, 410 to 419 illustrate an initial knowledge-based graph created using a YAGO classification model as a data source.

In the state of the initial knowledge-based graph, the above-described information object in Table 3 may be added to the knowledge-based graph in the form of an entity graph as shown in 420.

More specifically, in the example of FIG. 4A, the <CVE-2015-2444> information object in Table 3 may be formed as a node 421 that is an entity in a CVE class 412 in the knowledge-based graph in consideration of a data type in which "CVE", "2015", and "2444" are connected. Furthermore, the <Symantec> information object in Table 3 may be formed as a node 426 that is an entity in the company class 418 and 419 in the knowledge-graph.

The <Internet Explorer vulnerability> and <Sundown EK> information objects in Table 3 are unknown objects that are not identified from the knowledge-based graph, and the unknown objects may be added to the knowledge-based graph by using the relationship between unknown objects and objects that are known in the knowledge-based graph.

More specifically, referring to the first row in Table 3, the <Internet Explorer vulnerability> has a <known as> relationship with the <CVE-2015-2444> node 421. Accordingly, a knowledge-based graph creation system according to an embodiment of the present disclosure may newly establish a node 431 having a 1-hop relationship with a node 421 that is created in advance, dispose the unknown information object <Internet Explorer vulnerability> in the node 431, connect the node 421 and the node 431 through an edge 434, and record the content of the edge 434 as <known as>.

Furthermore, referring to the third row in Table 3, the <Sundown EK> has a <has started using> relationship with the <Internet Explorer vulnerability> node 431. Accordingly, a knowledge-based graph creation system according to an embodiment of the present disclosure may newly establish a node 432 having a 1-hop relationship with a node 431 that is created in advance, dispose the unknown information object <Sundown EK> in the node 432, connect the node 432 and the node 431 through an edge 433, and record the content of the edge 433 as <has started using>.

The unknown object <Sundown EK> 432 is an exploit kit (EK) by the name of "Sundown", and there is no appropriate class, to which the corresponding object can belong, in the taxonomy graph included in FIG. 4A. In this case, a data analysis system according to an embodiment of the present disclosure may recommend a new class node to newly establish an appropriate class and expand the taxonomy, and recommend unknown objects as entities of the new class node.

For example, in FIG. 4B, when multiple unknown objects such as nodes 432 and 456 to 459 are connected to entity objects 461, 462, and 463 of a CVE class node 412, and the corresponding objects include the same keyword, "EK", a data analysis system according to an embodiment of the present disclosure may recommend to define a new class by determining that there is a high possibility that the unknown objects 456, 457, 458, 459, and 432 belong to the same class.

For example, as shown in FIG. 4B, the data analysis system may recommend to newly establish a top class "Malware" 450 and a sub class "Exploit Kit" 455. Furthermore, the data analysis system may connect the unknown objects 456, 457, 458, 459, and 432 which share the "exploit kit" as a keyword to the new classes 450 and 455 so as to update the knowledge-based graph as shown in FIG. 4C.

Furthermore, a data analysis system according to an embodiment of the present disclosure may recommend to update the relationship between class objects, that is, an edge, in the knowledge-based graph. For example, in FIG. 4B, the CVE objects 461, 462, and 463 and the exploit kit objects 456, 457, 458, 459, and 432 are represented by different relationships, i.e., different edges, but may indicate substantially the same relationship. When a relationship (edge) having different representations but having substantially the same content is identified, a data analysis system according to an embodiment of the present disclosure may recommend to define a new edge.

For example, as shown in FIG. 4C, the data analysis system may define the relationship between the CVE 412 class and the Exploit Kit 455 class as an exploits Vulnerability relationship 473, and in this case, objects belonging to the corresponding classes may also use the corresponding relationship by inheriting the same.

Returning to the description of FIG. 3, in operation 370, the data analysis system may annotate a label and/or metadata of an edge and/or a node in the knowledge-based graph. For example, in the knowledge-based graph in FIG. 4A, the data analysis system may configure metadata 441, 442, 443, and 444 of sources of information as labels for the corresponding nodes.

Thereafter, in operation 380, the data analysis system may more precisely curate the knowledge-based graph to which elements such as a node, an edge, and a label are added. For example, in the example of FIG. 4A, the <Internet Explorer vulnerability> node 431 is treated as an entity instance connected to the node 421, but may be classified as a sub class of the class node 410. Even in this case, the 1-hop relationship with the node 421 can be maintained. Accordingly, the data analysis system may perform curation to change the location of the node 431 to the sub class of 410, and update the knowledge-based graph as shown in FIG. 4C.

A data analysis system according to an embodiment of the present disclosure may update a knowledge-based graph by curating a class, an entity, and/or an edge in the knowledge-based graph, and a record of the curation may be managed to be included in the knowledge-based graph as shown in 471 and 475 of FIG. 4C. Returning to the description of FIG. 2, the data analysis system may expand the knowledge-based graph through operations 210 to 250 by applying the collected data to the knowledge-based graph, and infer the relevance by using the created knowledge-based graph in operation 270.

For example, a case in which blockchain data including distributed ledger information and cryptocurrency address group information is applied to the knowledge-based graph may be considered. The distributed ledger information may include cryptocurrency block data such as a block generation time, a deposit/withdrawal amount, a transaction fee, a previous block, and a next block, and transaction information in a block, such as a transaction amount, a fee, and a deposit/withdrawal cryptocurrency address, and may be managed as metadata. Accordingly, the blockchain data may include cryptocurrency block data included in distributed ledger information of various cryptocurrencies and transaction information in a block, and may include owner information such as a cryptocurrency address group (wallet).

The cryptocurrency transaction record may be connected to a node through an edge and formed in a first knowledge-based graph, and may be mapped to a second knowledge-based graph of an illegal transaction.

In this case, in a cryptocurrency network graph that is the first knowledge-based graph, a first node may be generated by using a first object or a first property extracted from standardized blockchain data, and a cryptocurrency network graph may be constructed by using the relationship (edge) between corresponding nodes. For example, a network graph such as cryptocurrency deposit address (object node)-remittance amount (edge)-cryptocurrency withdrawal address (object node), or a network graph such as owner X (object node) which group information is applied-remittance amount (edge)-ransomware (property node) may be generated.

Furthermore, in the second knowledge-based graph of an illegal transaction, a second node may be generated by using a second object or a second property extracted from standardized multi-domain data, and the second knowledge-based graph may be constructed by using the relationship (edge) between the corresponding nodes. For example, a second knowledge-based graph may be constructed by generating a node and an edge such as user ID (object node)-ownership (edge)-cryptocurrency address (object node) by using profile data extracted from a web page of a dark web, and generating a node and an edge such as cryptocurrency address (object node)-deposit (edge)-product (object node) by using sales data extracted from a web page.

The second knowledge-based graph may be also displayed on one or more layers as the first knowledge-based graph, and have a multi-layer structure. The knowledge-based graphs of respective layers may belong to different categories.

Thereafter, the data analysis system may generate a transaction analysis knowledge-based graph by mapping a first node and a second node that correspond to each other. For example, a case in which node (A) included in a first layer in the first knowledge-based graph, which is a cryptocurrency network graph corresponds to address a, node (B) corresponds to address b, the two addresses belonging to the same group, and node (C) included in a first layer in the second the knowledge-based graph corresponds to cryptocurrency address b may be considered.

Node (B) and node (C) include the same information, and may be thus mapped to each other. That is, the transaction analysis knowledge-based graph may have a multi-layer structure in which nodes in the first knowledge-based graph of the cryptocurrency transaction record and the second knowledge-based graph are mapped to each other, and accordingly, it is possible to interpret the elements of the first knowledge-based graph of the cryptocurrency network through the elements of the second knowledge-based graph by using the transaction analysis knowledge-based graph. For example, when node (C) is connected to node (D) indicating a user ID through an edge of ownership, the owners of addresses a and b are subjects having a user ID corresponding to node (D).

In addition, inferring the relationship between nodes that are not directly connected is possible. For example, the second knowledge-based graph of an illegal transaction is a graph representing the relationships between cryptocurrency addresses used by sellers and sales articles, and includes information on a seller and a sales article, and the first knowledge-based graph of the cryptocurrency transaction record includes information on a transaction between cryptocurrency addresses. In this case, through the relationship inference, a sales article for which a cryptocurrency address that is not explicitly indicated in the second knowledge-based graph is used may be predicted.

More specifically, financial activities of cryptocurrency addresses indicated in the second knowledge-based graph of the illegal transaction are recorded in the first knowledge-based graph of the cryptocurrency transaction record, and thus a data analysis system according to an embodiment of the present disclosure may link pieces of information in the two graphs, and accordingly, and secure probability data on transactions on a specific article and a specific type of an article. Generating an article transaction model by utilizing the corresponding data as base data of an inference algorithm (including machine learning and deep learning) is advantageous in that the purpose of use of the cryptocurrency address can be predicted at the high level of accuracy.

Figure 5:
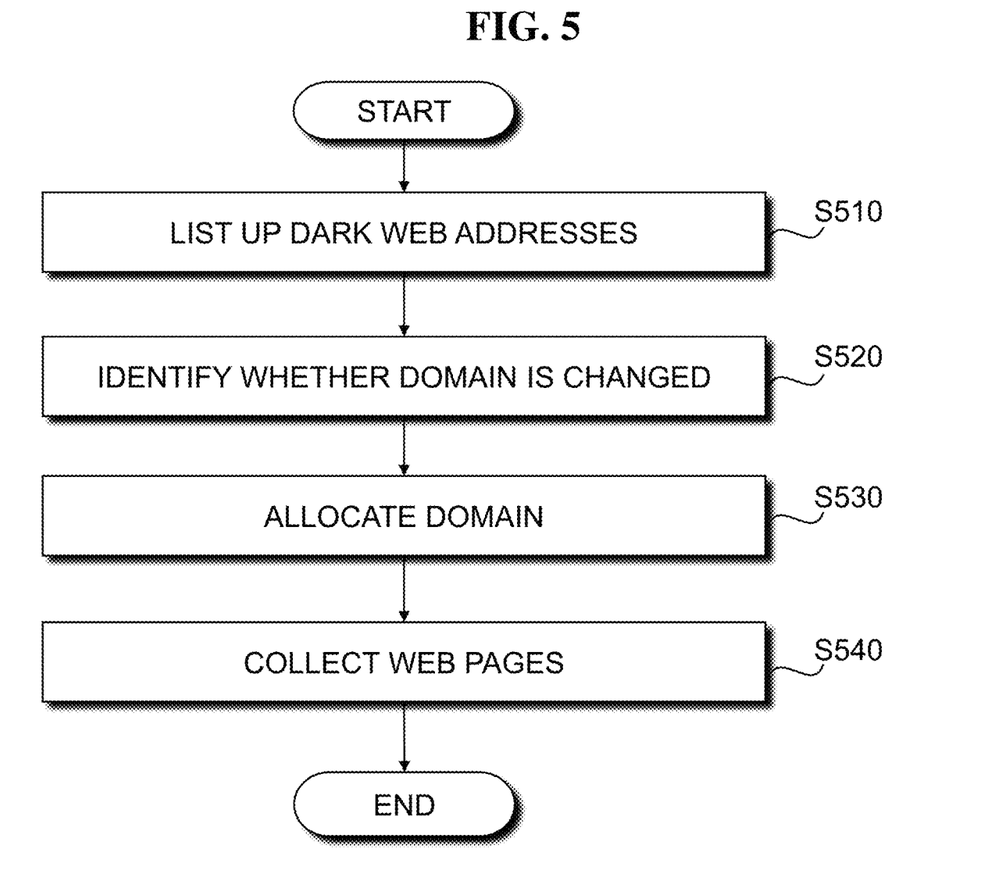
FIG. 5 illustrates a method for collecting massive data from a multi-domain according to an embodiment of the present disclosure.

FIG. 5 illustrates a process of collecting dark web data according to an embodiment of the present disclosure. A dark web exists in an encrypted network and indicates a specific type of website that is inaccessible using a normal browser. A number of sites exiting in the dark web are based on the Tor network (the onion network).

First, a data collection system according to an embodiment of the present disclosure may collect a list of domains in the Tor network (operation 510).

To this end, the data collection system according to an embodiment of the present disclosure may collect domain addresses by using a dark web index site or a Tor search engine such as Ahmia or FreshOnions.

Furthermore, the data collection system may collect domain addresses in the Tor network by crawling text contents from the corresponding address by using the collected domain address as a seed, and perform tracking according to links included in the dark web page until there is no link to traverse.

In operation 520, the data collection system may identify the states of the collected domain addresses according to a pre-configured period. For example, the data collection system may identify whether the corresponding domain is in operation or closed, by using a STEM API of the Tor, or identify whether the content of a web page operated by the corresponding domain is added, deleted, or amended, and recording state change information in metadata of the corresponding domain.

Thereafter, the data collection system may implement a distributed crawler and multiple containers for operating multiple Tor nodes, and allocate the collected domains to the distributed crawler (operation 530).

More specifically, the data collection system according to an embodiment of the present disclosure may place a higher priority on domains, which have been identified as most recently registered domains, in allocating the same to the distributed crawler, with reference to preidentified registration states of the domains, or may dynamically allocate a domain to be crawled next time to a crawler instance for which crawling has been completed, by identifying states of respective crawler instance constituting the distributed crawler.

Thereafter, traffic occurring according to the operation of the crawler is transferred to each container through a load balancer, each container transfers a request to a dark web through a connected NIC, and the crawler may collect all pages of a dark web operated by the corresponding domain and record the same in a database (operation 540).

The embodiments of the present disclosure provided herein and shown in the drawings are merely specific examples provided in order to easily describe technical details of the present disclosure and to help the understanding thereof, and are not intended to limit the scope of the present disclosure. It will be apparent to those skilled in the art, to which the present disclosure belongs, that it is possible to practice other modified embodiments based on the technical idea of the present disclosure in addition to the embodiments provided herein.

The invention claimed is:

1. A method for processing a knowledge-based graph in a data processing device, the method comprising the operations of:
   a) creating a first knowledge-based graph comprising a taxonomy graph for a classification system of information objects and an entity graph for a relationship between specific information object instances;
   b) refining information extracted from a database in a pre-configured form, extracting, from the refined information, data relating to information objects and a relationship between the information objects, and updating the first knowledge-based graph by using the information objects and the relationship between the information objects; and
   c) inferring relevance of an arbitrary information object by using the updated first knowledge-based graph, wherein the operation b) comprises the operations of:
   b-1) identifying whether an information object extracted from the database is an unknown object which is not identified from the first knowledge-based graph;
   b-2) based on the information object extracted from the database being identified as the unknown object, newly establishing a node having a 1-hop relationship with a pre-generated node corresponding to the relationship between the information objects in the first knowledge-based graph, and generating an unknown object node by disposing the unknown object in the newly established node; and
   b-3) identifying multiple unknown object nodes sharing a same keyword with each other and connected to one or more entity nodes belonging to an arbitrary class, newly establishing a new class in the taxonomy graph of the knowledge-based graph by using the multiple unknown objects, and connecting the multiple unknown object nodes to the new class, the multiple unknown object nodes including the generated unknown object node;
   b-4) updating an edge which is a relationship between the arbitrary class and the new class,
   wherein the one or more entity nodes belonging to the arbitrary class and the multiple unknown object nodes connected to the new class inherit the relationship between the arbitrary class and the new class.

2. The method of claim 1, wherein the operation b) further comprises: based on the information object extracted from the database being identified as corresponding to a node in the first knowledge-based graph, applying, to the first knowledge-based graph, a first information object having a keyword or a data type similar to that of a component of the first knowledge-based graph among the information objects by using the similarity of the keyword or the data type, and applying, to the first knowledge-based graph, a second information object by using relevance of the first information object.

3. The method of claim 1, wherein the node being connected a cryptocurrency transaction record, the cryptocurrency transaction record is stored in a second knowledge-based graph.

4. The method of claim 3, wherein the second knowledge-based graph is associated with illegal transactions.

5. The method of claim 3, further comprising mapping illicit nodes from the first knowledge-based graph to the second knowledge-based graph.

6. The method of claim 5, further comprising interpreting a first element from the first knowledge-based graph for the second knowledge-based graph using the transaction analysis.

7. The method of claim 6, further comprising linking the second knowledge-based graph to the first knowledge-based graph using at least a cryptocurrency transaction record.

8. The method of claim 1, further comprising collecting domain addresses by using a dark web index site.

9. The method of claim 8, further comprising crawling text contents from the corresponding address by using the collected domain address as a seed.

* * * * *